Nov. 26, 1940.                F. J. SWEET                2,223,135
                        VARIABLE SPEED TRANSMISSION
                    Filed Sept. 16, 1938        4 Sheets-Sheet 1
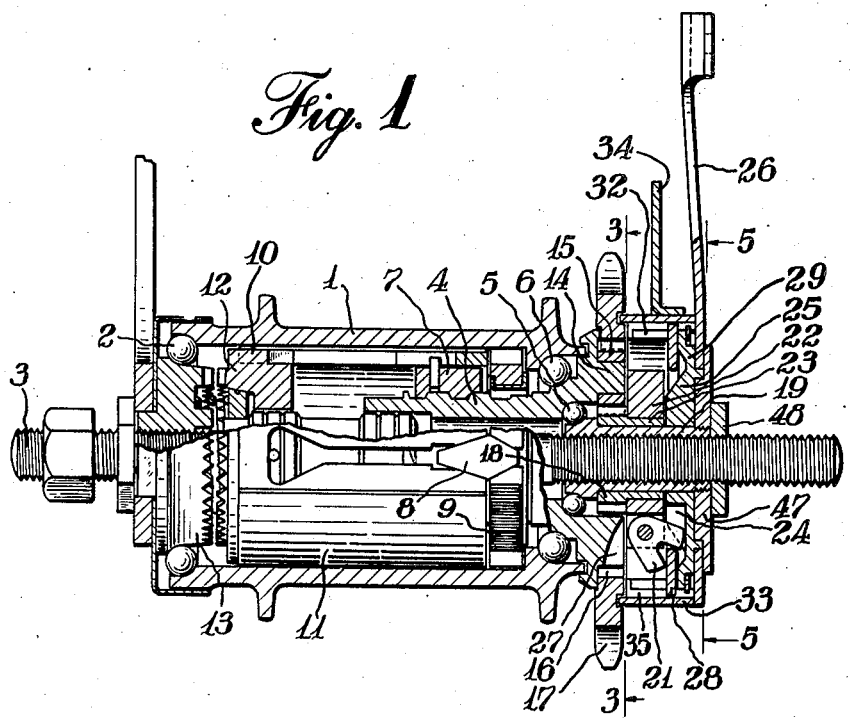
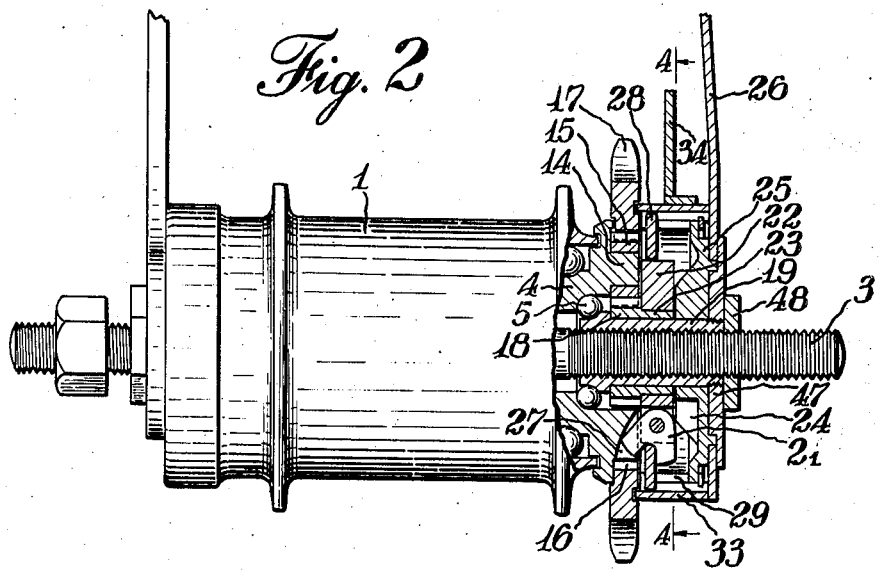
Witness:
Burr W. Jones
INVENTOR.
Floyd J. Sweet
BY Clinton S. James
ATTORNEY.

Nov. 26, 1940.   F. J. SWEET   2,223,135
VARIABLE SPEED TRANSMISSION
Filed Sept. 16, 1938   4 Sheets-Sheet 2
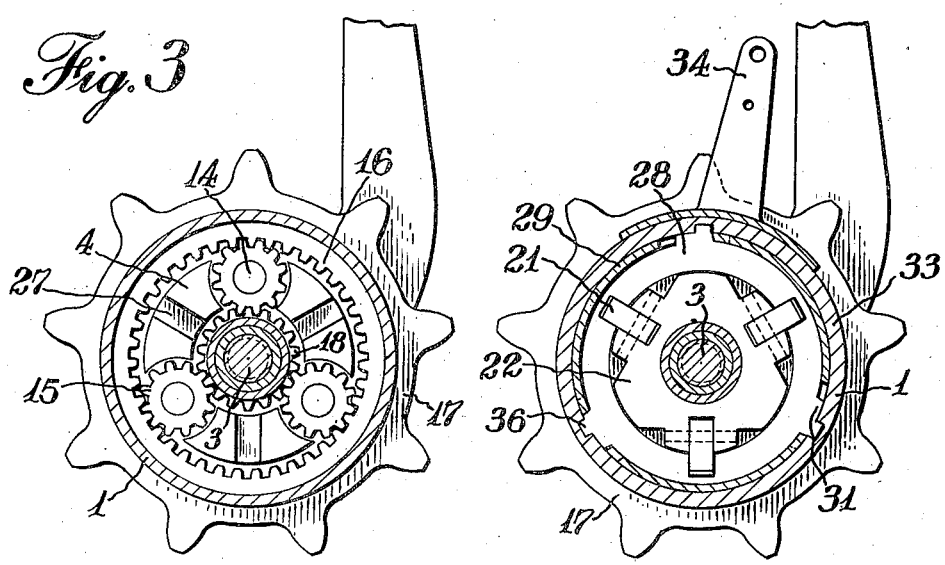
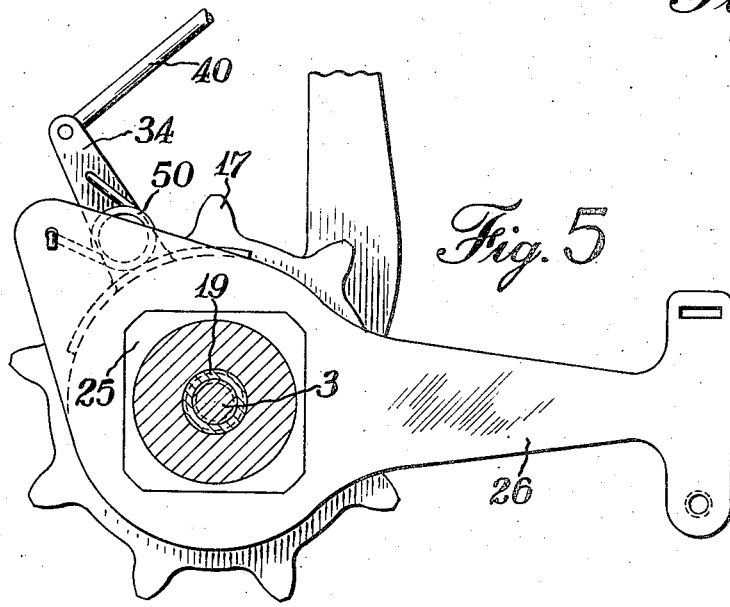
INVENTOR.
Floyd J. Sweet Nov. 26, 1940.  F. J. SWEET  2,223,135
VARIABLE SPEED TRANSMISSION
Filed Sept. 16, 1938  4 Sheets-Sheet 3
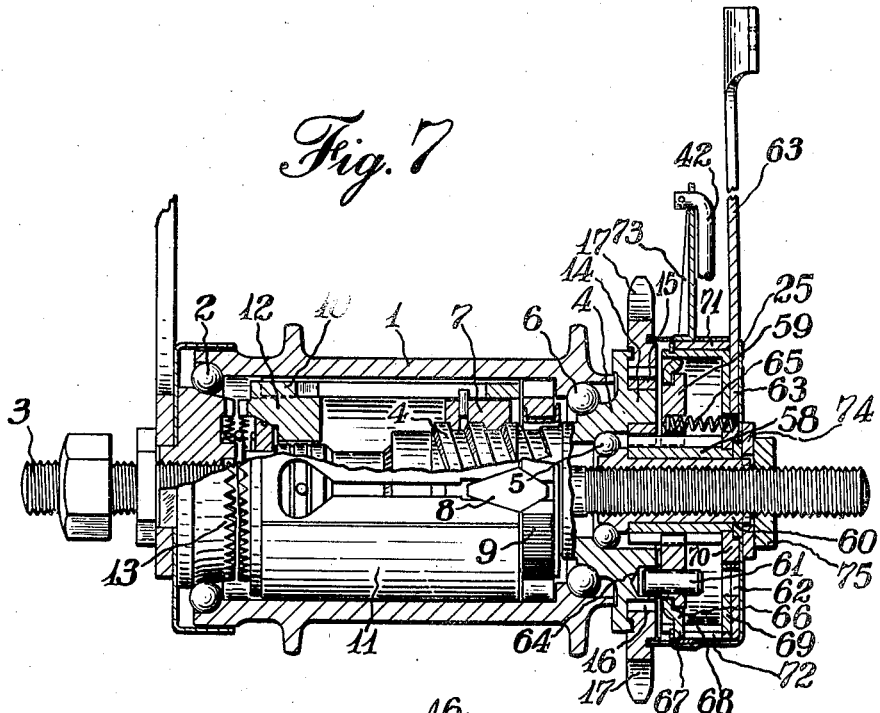
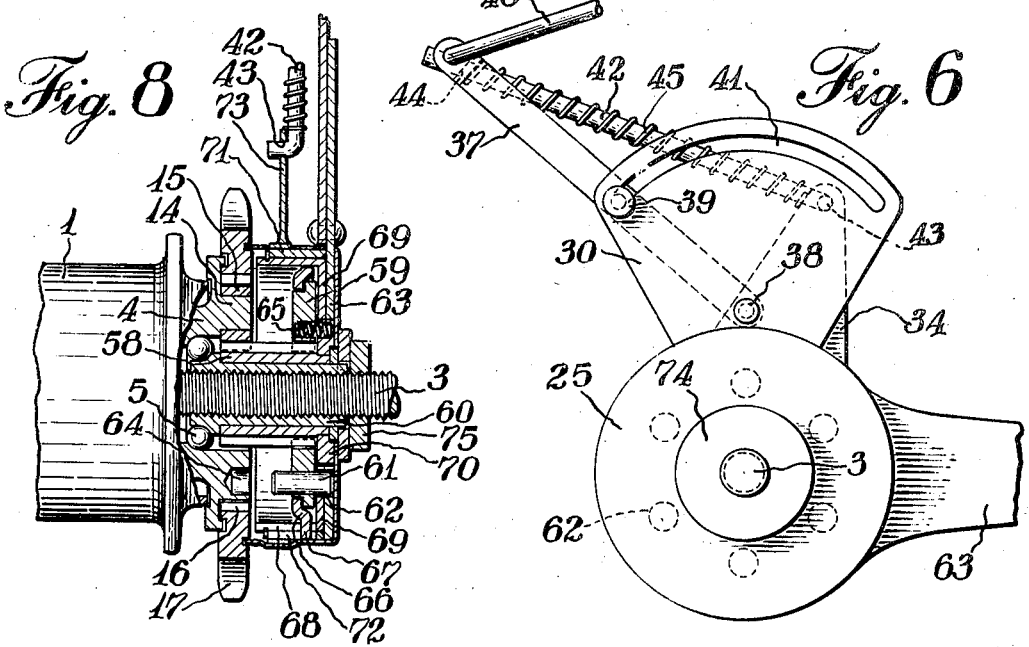
INVENTOR.
Floyd J. Sweet Nov. 26, 1940.  F. J. SWEET  2,223,135
VARIABLE SPEED TRANSMISSION
Filed Sept. 16, 1938  4 Sheets-Sheet 4
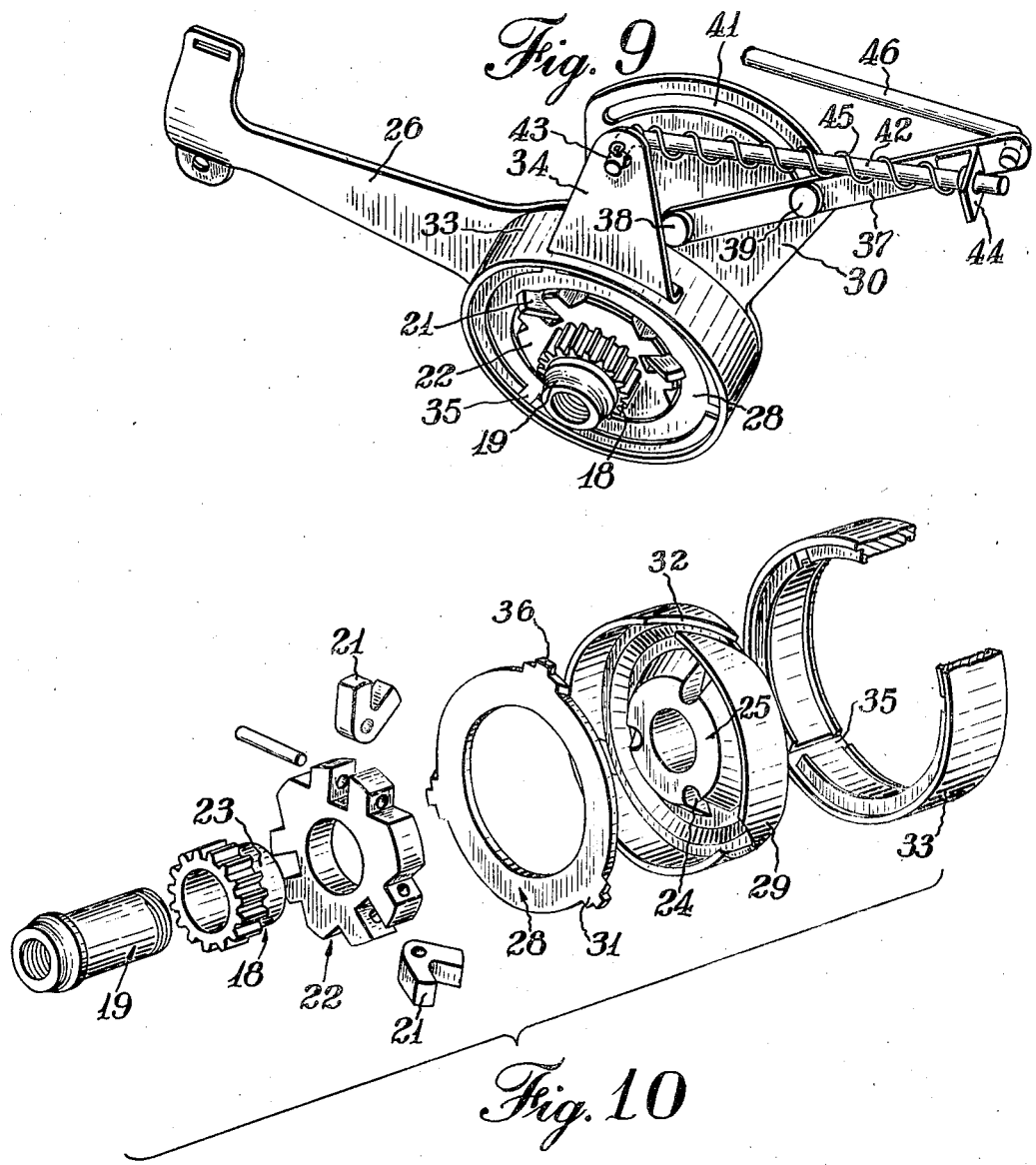
INVENTOR.
Floyd J. Sweet
ATTORNEY.

Patented Nov. 26, 1940

2,223,135

UNITED STATES PATENT OFFICE 2,223,135

VARIABLE SPEED TRANSMISSION

Floyd J. Sweet, Elmira, N. Y., assignor to Bendix Aviation Corporation, South Bend, Ind., a corporation of Delaware Application September 16, 1938, Serial No. 230,294

9 Claims. (Cl. 74—290)

The present invention relates to variable speed transmissions and more particularly to variable ratio gearing for velocipedes and the like, arranged to be incorporated in the wheel hub of the vehicle.

It is an object of the present invention to provide a novel gear unit of the above type which is efficient and reliable in operation while being simple and economical in construction.

It is another object to provide such a device incorporating gears constantly in mesh, with manually shiftable keying means for effecting changes in gear ratio.

It is a further object to provide such a device in which the keying means are shifted by means of a "snap-action" device whereby the changes in gear ratio are effected surely, quickly and without lost motion.

It is another object to provide such a device in which the shifting means is small and compact, but easily operated and not subject to sticking or jamming.

It is another object to provide such a device in which the shifting is effected by a small angular motion of a rotary shifter.

It is another object to provide such a device in which the driving element, gearing and shifting means are incorporated in a sub-assembly which is readily merchandized and installed as a unit in a commercial type of coaster brake.

Further objects and advantages will be apparent from the following description taken in connection with the accompanying drawings in which:

Fig. 1 is a side elevation partly in section and partly broken away of a commercial form of bicycle coaster brake with which is incorporated a preferred form of the present invention;

Fig. 2 is a similar view showing the reduction gearing in shifted position;

Fig. 3 is a section taken substantially on the line 3—3 of Fig. 1 showing the reduction gearing and associated parts;

Fig. 4 is a section taken substantially on the line 4—4 of Fig. 2 showing the shiftable keying means and associated parts;

Fig. 5 is a section taken substantially on the line 5—5 of Fig. 1 showing one form of operating means for the shift;

Fig. 6 is an end elevation of the device showing another preferred form of shifting means;

Fig. 7 is a view similar to Fig. 1 showing a modified form of keying and shifting means;

Fig. 8 is a detail of the gearing as illustrated in Fig. 7, showing the keying means in shifted position;

Fig. 9 is a perspective view of a sub-assembly including a transmission of the type illustrated in Fig. 1, with the shifting mechanism shown in Fig. 6; and Fig. 10 is a detail in perspective showing in disassembled relation the shiftable keys and the operating mechanism therefor of the transmission illustrated in Fig. 1.

In Fig. 1 of the drawings there is illustrated a cylindrical hub member 1 journalled as indicated at 2 on an axle 3 which is adapted to be clamped in conventional manner in the frame of a velocipede such as a bicycle, not illustrated. The hub 1 is arranged to be rotated by an operating member 4 journalled at 5 on the axle 3 and supporting the adjacent end of the hub 1 by means of bearings 6. A driving connection is provided between the operating member 4 and the hub comprising a nut member 7 threaded on the operating member and provided with wedges 8 adapted to engage a pair of arcuate clutch elements 9 loosely mounted in the hub and adapted to engage and rotate the same when the nut member 7 is actuated by forward rotation of the operating member.

Braking means for the hub under the control of the operating member 4 are provided in the form of a sleeve brake 11 arranged to be connected by a dental clutch element 12 to a stationary clutch element 13. Brake sleeve 11 is adapted to be expanded by the wedges 8 of nut 7 and wedges 10 of clutch element 12 into frictional engagement with the interior of the hub 1 upon backward rotation of the operating member 4.

It will be appreciated that the structure so far described is the present commercial form of the coaster brake illustrated and described in the patent to Morrow No. 906,149, and since no novelty as respects this structure is herein asserted, further description thereof is deemed unnecessary.

According to the present invention, the operating member 4 serves as a carrier for a plurality of planetary reduction gears, and for this purpose is provided with a plurality of bearings 14 for planet gears 15 rotatably mounted thereon and meshing with an orbit gear 16 formed in the interior of a driving sprocket 17. A sun gear 18 meshing with the planet gears is journalled on a bearing member 19 threaded on the axle 3.

Means are provided for locking the sun gear 18 to the planet carrier 4, or alternatively to hold the sun gear stationary in order to transmit rotation directly or at a reduced gear ratio respectively, from the sprocket 17 to the operating member 4. As illustrated in Figs. 1 to 4, 9 and 10, the locking means comprises a plurality of bifurcated key members 21 pivotally mounted in a spider 22 (Fig. 10) suitably fixed as by welding on an extension 23 of the sun gear 18. When in the low speed position as illustrated in Fig. 1, the keys 21 are arranged to engage in recesses 24 in an anchor member 25 which is held from rotation by suitable means such as an arm 26 arranged to engage the frame of the vehicle. When the keys 21 are moved into high gear position, they are arranged to engage in openings 27 in the planet carrier 4 as illustrated in Fig. 2.

Means are provided for swinging the keys 21 from one operative position to the other in the form of a shifter ring 28 (Fig. 10), the inner periphery of which is arranged to engage between the furcations of the key members 21, and the outer periphery of which slidably engages within a cup-shaped flange 29 formed on or suitably affixed to the anchor member 25. Shifter ring 28 is provided with peripheral lugs 31 formed to traverse inclined slots 32 in the cup 29 whereby relative rotation between the ring and cup causes traversal of the ring and consequently shifting traversal movement of the key members 21. Manually operable means for rotating the ring 28 are provided in the form of a sleeve member 33 journalled on the cup 29 arranged to be rotated by an arm 34 (Fig. 9) suitably fixed thereto. Sleeve 33 is provided with longitudinal slots 35 (Fig. 10) arranged to cooperate with keying elements 36 formed on lugs 31 to form a splined connection between the ring 28 and sleeve 33.

The manual means for rotating the sleeve 33 is preferably in the form of a "snap-action" device, one form of which is illustrated in Figs. 6 and 9. As there shown, a quadrant flange 30 is fixed in any suitable way to the anchor member 25, and a lever 37 is pivoted thereto at 38 and provided with a stud 39 arranged to engage an arcuate slot 41 in the quadrant to guide the lever and limit its oscillation. A sliding link 42 is pivoted at 43 to the end of the operating arm 34 and is slidably mounted at its opposite end in a lug 44 formed on the end of the lever 37. A compression spring 45 is mounted on the sliding link 42 bearing against the pivot 43 and lug 44 so as to tend to maintain these elements in extended relation. A manually operable link 46 is pivoted to the end of the lever 37 and is connected in any suitable way to any preferred form of operating device conveniently located for manipulation by the rider of the vehicle.

It will be appreciated that the reduction gear unit herein disclosed is adapted for use with commercial coaster brakes of the Morrow type by merely substituting the gear units including the planet carrier operating member 4 for the conventional sprocket-driven operating member of the coaster brake. As a matter of convenience, it is desirable that the gear unit may be adjusted, merchandized and installed as a self-contained unit, and for this purpose the sun gear, anchor member and associated parts are retained on the bearing member 19 by means of a lock nut 47 threaded on the end of the bearing. The bearings 2, 5 and 6 are adjusted by rotation of the bearing member 19 on the axle 3 as by means of a spanner engaging the lock nut 47 or in any other suitable manner, the adjustment being maintained by suitable means such as a lock nut 48 threaded on the axle.

In the operation of this embodiment of the invention, starting with the parts in the positions illustrated in Fig. 1, roation of the sprocket and orbit gear member 17 by the operator in a forward direction causes rotation of the planet gears 15 therein. Sun gear 18 is prevented from rotation by the engagement of the key members 21 in the recesses 24 in the anchor member 25 whereby the planets 15 are constrained to planetate around the sun gear, causing rotation of the planet carrier 4 at reduced speed, which rotation is transmitted to the hub 1 through the nut 7 and clutch members 9 in the usual manner. When it is desired to operate in high gear, the operator manipulates the link 46 to move the lever 37 into the position illustrated in Fig. 6 whereby the spring 45 actuates the arm 34 to rotate the sleeve 33 and thereby cause traversal of the shifter ring 28 to move the keys 21 into the position illustrated in Fig. 2. The sun gear 18 is thereby locked to the planet carrier 4 whereby the sprocket and planetary gearing assembly are caused to rotate as a unit, which rotation is transmitted to the hub 1 as above set forth. When it is desired to return to the low gear position, the link 46 is manipulated to move the lever 37 to the opposite end of the slot 41 in the quadrant 30. As soon as the lever 37 passes beyond its dead center position with respect to the arm 34, the spring 45 becomes effective to urge the arm 34 into its low gear position where it is thus maintained by the expansive force of the spring.

It will be understood that the arm 34 may, if desired, be directly operated by a manual connection. Such an arrangement is illustrated in Fig. 5 in which the arm 34 is shown to be actuated by a manually operable link 40. An expansive spring 50 is preferably connected at its ends to the shaft arm 34 and anchor arm 26 as illustrated, whereby it is effective to urge the shift arm from any intermediate position toward the nearest end of its arc of travel.

In the embodiment of the invention illustrated in Figs. 7 and 8, the parts of the coaster brake and planetary gearing are similar to the structure first described, and are similarly numbered. In this embodiment, however, the sun gear 58 is formed as an elongated gear journalled on an adjustable bearing member 60. A spider 59 is splined on the sun gear and carries a plurality of key members in the form of pins 61 adapted to engage alternatively in openings 62 in an anchor member 63, or in openings 64 in the planet carrier 4. The spider 59 is normally maintained in the high gear position as illustrated in Fig. 7 by yielding means in the form of springs 65 seating against the spider and in a thrust ring 70 mounted on the end of sun gear 58. Means for moving the spider longitudinally to disengage the pins 61 from planet carrier 4 and engage them with the anchor member 63 are provided in the form of a shifter ring 66 journaled on the periphery of the spider and provided with radial lugs 67 arranged to traverse longitudinal slots 68 in a cup member 69 fixed in any suitable way to the anchor member 63. Manually operable means for moving the ring 66 longitudinally is provided in the form of a rotatable sleeve 71 journalled on the periphery of the cup member 69 and having inclined slots 72 adapted to receive the ends of the lugs 67 of the shifter ring 66. Rotation of the sleeve 71 by the operator to adjust the shifter ring is effected by an arm 73 which is actuated preferably by the same form of snap-action shifting means illustrated in Fig. 6.

In this embodiment of the invention, the bearing sleeve 60 is adjusted by means of a disc 74 splined on the end of the sleeve and formed to receive a wrench or spanner for manual rotation. The parts are maintained in adjusted position by suitable means such as a lock nut 75.

The operation of this embodiment of the invention is substantially similar to that previously described. In the high gear position as illustrated in Fig. 7, the sun gear 58 is locked to the planet carrier 4 by the pins 61 for rotation in unison whereby the hub 1 is driven at the same speed as the sprocket 17. Operation of the shifting mechanism by the rider of the vehicle to rotate the sleeve 71 and thus move the spider 59 to cause the pins 61 to engage in the openings 62 in the anchor member 63, causes the sun gear to be prevented from rotation whereby the planet carrier 4 and the hub are caused to rotate at a reduced speed from the sprocket 17.

It will be understood that in both embodiments of the invention arresting the rotation of the sprocket 17 causes the parts of the coaster brake to move into coasting position whereby the hub 1 is permitted to rotate freely, and backward rotation of the sprocket 17 causes application of the brake in the usual and well-known manner.

Although certain embodiment of the invention have been shown and described in detail, it will be understood that other embodiments are possible and various changes may be made in the design and arrangement of the parts without departing from the spirit of the invention as dedefined in the claims appended hereto.

What is claimed is:

1. In a variable speed transmission for velocipedes and the like, a driving orbit gear, a driven planet carrier, a sun gear, planet gears on the carrier meshing with the orbit and sun gears, an anchor member, a key member rotatably mounted on the sun gear, and manually operable means for tilting said key member to cause it to engage the planet carrier or the anchor member alternatively.

2. In a variable speed transmission for velocipedes and the like, a driving orbit gear, a driven planet carrier, a sun gear, planet gears on the carrier meshing with the orbit and sun gears, an anchor member, a bifurcated key pivotally mounted on the sun gear, and manually operable means for tilting said key to alternatively engage it with the planet carrier or the anchor member.

3. In a variable speed transmission for velocipedes and the like, a driving orbit gear, a driven planet carrier, a sun gear, planet gears on the carrier meshing with the orbit and sun gears, an anchor member, a bifurcated key pivotally mounted on the sun gear, and means for tilting the key into engagement with the planet carrier or the anchor member including a nonrotatable member having a rib engaging between the furcations of the key, and a manually operable rotatable member having an inclined connection with the non-rotatable member.

4. In a velocipede or the like, a hub, an operating member therefor journalled therein, an axle journalled in the hub, driving means for the operating member including a sprocket and orbit gear member, planet gears meshing therein journalled on the operating member and a sun gear meshing with the planet gears, a bearing member for the axle in the operating member adjustably mounted on the axle and forming a journal for the sun gear, and anchor member journalled on the bearing member, means for holding the anchor member stationary while permitting rotary adjustment of the bearing member on the axle, and keying means rotatable with the sun gear but movable with respect thereto to alternatively engage the operating member or the anchor member.

5. In a velocipede or the like, a hub, an operating member therefor journalled therein, an axle journalled in the hub, driving means for the operating member including a sprocket and orbit gear member, planet gears meshing therein journalled on the operating member and a sun gear meshing with the planet gears, a bearing member adjustably mounted on the axle rotatably supporting the sun gear, an anchor member mounted on the bearing member, means for adjustably confining the sun gear and anchor member on the bear member, means for locking the bearing member in adjusted position, and manually operable keying means for optionally locking the sun gear to the operating member or the anchor member.

6. In variable speed gearing for velocipedes or the like, a driving orbit gear member, a driven planet carrier, a controlling sun gear, an anchor member, keying means pivotally connected to the sun gear, a non-rotatable ring member engaging the keying means and movable to shift said means alternatively into engagement with the planet carrier or the anchor member, and a manually operable rotatable sleeve having an inclined connection with said ring.

7. In a velocipede or the like, a hub, an operating member therefor journalled therein, an axle journalled in the hub, and driving means for the operating member including a sprocket member, planetary reduction gearing comprising a sun gear, a stationary bearing member for the sun gear adjustably mounted on the axle, an anchor member journalled on the bearing member, a torque arm holding the anchor member stationary while permitting rotary adjustment of the bearing member on the axle, a keying member non-rotatably mounted on the sun gear and having keys movable into engagement with either the operating member or the anchor member, and manually operable means for shifting said keys.

8. In a velocipede or the like, a hub, an operating member therefor journalled therein, an axle journalled in the hub, and driving means for the operating member including a sprocket member, planetary reduction gearing comprising a sun gear, a stationary bearing member for the sun gear adjustably mounted on the axle, an anchor member on the bearing member, a keying member splined on the sun gear and having keys movable into engagement with either the operating member or anchor member, and manually operable means for shifting said keying member longitudinally.

9. In a velocipede or the like, a hub, an operating member journalled therein, an axle journalled in the operating member, driving means for the operating member including a sprocket member, planetary reduction gearing comprising a sun gear, means rotatably mounting the sun gear on the axle, an anchor member, said operating member and anchor member having oppositely arranged openings, and keying means nonrotatably connected to the sun gear and shiftable to engage either the openings in the operating member or those in the anchor member, and snap action shifting means for the keying means including a lever, a spring link operatively connected thereto, and manually operable means for compressing the spring link and moving it beyond dead center with respect to said lever so that expansion of the link moves the lever to shift the keying means.

FLOYD J. SWEET.